United States Patent [19]
Nishida et al.

[11] Patent Number: 5,907,377
[45] Date of Patent: *May 25, 1999

[54] PRODUCTION PROCESS OF COLOR FILTER FOR LCD EMPLOYING BLACK MATRIX AS MASK FOR ETCHING

[75] Inventors: Naoya Nishida, Hadano; Takashi Enomoto, Sagamihara, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/528,785

[22] Filed: Sep. 15, 1995

[30] Foreign Application Priority Data

Sep. 19, 1994 [JP] Japan .................................. 6-223163
Sep. 13, 1995 [JP] Japan .................................. 7-235072

[51] Int. Cl.⁶ ................................................. G02F 1/1335
[52] U.S. Cl. ........................ 349/106; 349/187; 349/110; 427/68; 427/162; 427/534; 445/47
[58] Field of Search ..................... 349/106, 110, 349/187; 427/68, 162, 534, 532; 445/47, 6

[56] References Cited

U.S. PATENT DOCUMENTS

| | | | |
|---|---|---|---|
| 4,135,112 | 1/1979 | Fisher et al. ........................... | 313/470 |
| 4,313,124 | 1/1982 | Hara ..................................... | 346/140 R |
| 4,345,262 | 8/1982 | Shirato et al. ....................... | 346/140 R |
| 4,418,284 | 11/1983 | Ogawa et al. ......................... | 250/578 |
| 4,459,600 | 7/1984 | Sato et al. ........................... | 346/140 R |
| 4,463,359 | 7/1984 | Ayata et al. .......................... | 346/1.1 |
| 4,558,333 | 12/1985 | Sugitani et al. ..................... | 346/140 R |
| 4,608,577 | 8/1986 | Hori ..................................... | 346/140 R |
| 4,698,113 | 10/1987 | Ogawa ................................. | 156/275.7 |
| 4,723,129 | 2/1988 | Endo et al. ........................... | 346/1.1 |
| 4,740,796 | 4/1988 | Endo et al. ........................... | 346/1.1 |

(List continued on next page.)

FOREIGN PATENT DOCUMENTS

| | | |
|---|---|---|
| 0400738 | 12/1990 | European Pat. Off. . |
| 0552035 | 7/1993 | European Pat. Off. . |
| 54-56847 | 5/1979 | Japan . |
| 01235903 | 9/1982 | Japan . |
| 59-75205 | 4/1984 | Japan .............................. G02B 5/20 |
| 59-123670 | 7/1984 | Japan . |
| 59-138461 | 8/1984 | Japan . |
| 60-71260 | 4/1985 | Japan . |
| 61-77014 | 4/1986 | Japan . |
| 63-235901 | 9/1988 | Japan .............................. G02B 5/20 |
| 63-294503 | 12/1988 | Japan . |
| 01217320 | 8/1989 | Japan . |
| 02228605 | 9/1990 | Japan . |
| 3-10220 | 1/1991 | Japan . |
| 04317007 | 11/1992 | Japan . |
| 04349401 | 12/1992 | Japan . |
| 05173010 | 7/1993 | Japan . |
| 05288913 | 11/1993 | Japan . |
| 93 24240 | 12/1993 | Japan . |
| WO93/24240 | 12/1993 | WIPO ............................. B05D 1/18 |

OTHER PUBLICATIONS

Patent Abstracts of Japan, vol. 17, No. 526 (Sep. 1993) (P–1617).
Patent Abstracts of Japan, vol. 17, No. 703 (Dec. 1993) (P–1666).

(List continued on next page.)

Primary Examiner—William L. Sikes
Assistant Examiner—Kenneth Parker
Attorney, Agent, or Firm—Fitzpatrick, Cella, Harper & Scinto

[57] ABSTRACT

Disclosed herein is a process for producing a color filter, which comprises the steps of:
  providing a glass base equipped with black matrices;
  etching the glass base using the black matrices as a mask to form pixel holes in the base; and then
  applying inks into the pixel holes to form colored pixels of different colors.

6 Claims, 7 Drawing Sheets

U.S. PATENT DOCUMENTS

| | | | |
|---|---|---|---|
| 4,818,075 | 4/1989 | Takao et al. | 350/339 F |
| 4,846,556 | 7/1989 | Haneda | 350/317 |
| 4,864,324 | 9/1989 | Shirota et al. | 346/1.1 |
| 4,882,616 | 11/1989 | Manabe | 430/235 |
| 4,965,612 | 10/1990 | Sakaki et al. | 346/1.1 |
| 4,981,614 | 1/1991 | Miyazaki et al. | 252/587 |
| 4,995,705 | 2/1991 | Yoshinaga et al. | 350/350 |
| 5,011,623 | 4/1991 | Yoshinaga et al. | 252/299.5 |
| 5,039,208 | 8/1991 | Ohnishi et al. | 359/100 |
| 5,079,214 | 1/1992 | Long et al. | 503/227 |
| 5,190,794 | 3/1993 | Yoshino et al. | 427/162 |
| 5,278,009 | 1/1994 | Iida et al. | 430/7 |
| 5,281,450 | 1/1994 | Yaniv | 427/165 |
| 5,317,434 | 5/1994 | Ohara | 359/68 |
| 5,340,619 | 8/1994 | Chen et al. | 424/498 |
| 5,358,558 | 10/1994 | Yamamoto et al. | 106/22 R |
| 5,418,094 | 5/1995 | Sato et al. | 430/7 |
| 5,420,708 | 5/1995 | Yokoyama et al. | 359/67 |
| 5,508,134 | 4/1996 | Shirai | 430/20 |
| 5,678,483 | 10/1997 | Johnson | 101/153 |
| 5,792,579 | 8/1998 | Phillips | 430/7 |

OTHER PUBLICATIONS

Patent Abstracts of Japan, vol. 8, No. 183 (Aug. 1984) (P–296).

Patent Abstracts of Japan, vol. 13, No. 37 (Jan. 1989) (P–819).

Patent Abstracts of Japan, vol. 13, No. 530 (Nov. 1989) (P–966).

Patent Abstracts of Japan, vol. 16, No. 382 (Aug. 1992) (P–1403).

Patent Abstracts of Japan, vol. 16, No. 197 (May 1992) (P–1350).

Patent Abstracts of Japan, JP–A 59 084 206 (Suwa Seikosha KK), May 15, 1984.

Patent Abstracts of Japan, JP–A–62 067 502 (Victor Co of Japan Ltd), Mar. 1987.

Patent Abstracts of Japan, JP–A–06 308 312 (Canon Inc), Nov. 4, 1994.

PRODUCTION PROCESS OF COLOR FILTER FOR LCD EMPLOYING BLACK MATRIX AS MASK FOR ETCHING

BACKGROUND OF THE INVENTION

1. Field of the Invention

The present invention relates to a production process of a color filter suitable for use in color liquid crystal display panels and the like, a color filter obtained by the production process and a liquid crystal display panel equipped with this color filter.

2. Related Background Art

Color filters of the dyeing type that a mordanting layer composed of a hydrophilic polymeric substance is provided and then colored in a dyeing bath to form color filter patterns have heretofore been most common. However, it has been pointed out that the production process of a color filter using this dyeing process involves the following problems.

The production process of a color filter using the dyeing process has a merit that many available dyes exist. On the other hand, as a process for dyeing a mordanting layer, it adopts a wet process difficult to control in that the mordanting layer is immersed in a dyeing bath in which a dye has been dissolved. Upon the dyeing, it requires a complicated step such as the provision of an intermediate layer for preventing color mixing every time the dyeing is performed with individual colors of red (R), green (G) and blue (B). It is hence difficult to enhance a yield. As a result, increase in production cost is unavoidable.

In order to omit such a complicated step, Japanese Patent Application Laid-Open Nos. 59-75205 and 63-235901, etc. have proposed a process for producing a color filter using an ink-jet system.

When a color filter is produced by an ink-jet system, the formation of the individual colored patterns of R, G and B can be performed at once. Therefore, it is an important problem to prevent color mixing between adjacent colored patterns of different colors. However, this problem cannot be satisfactorily solved by the techniques described in the above publications.

SUMMARY OF THE INVENTION

The present invention has been completed in view of the foregoing circumstances and has as its object the provision of a production process of a color filter, by which the color filter can be produced by simple steps and color mixing between adjacent colored patterns of different colors can be prevented, a color filter produced thereby and a color liquid crystal display panel equipped with the color filter.

The above object can be achieved by the present invention described below.

According to the present invention, there is thus provided a process for producing a color filter, which comprises the steps of:

providing a glass base equipped with black matrices;

etching the glass base using the black matrices as a mask to form pixel holes in the base; and then applying inks into the pixel holes to form colored pixels of different colors.

According to the present invention, there is also provided a process for producing a color filter, which comprises the steps of:

forming black matrices on a glass base;

etching the glass base using the black matrices as a mask to form pixel holes in the base; and then applying inks into the pixel holes to form colored pixels of different colors.

According to the present invention, there is further provided a color filter comprising a glass base having black matrices thereon, wherein the glass base is recessed at opening portions surrounded by the black matrices, and colored pixels of different colors are formed at the opening portions.

According to the present invention, there is still further provided a color liquid crystal display panel comprising the color filter described above, a base provided in an opposing relation with the color filter and a liquid crystal enclosed in a space between the color filter and the base.

According to the present invention, there is yet still further provided an information processor equipped with the panel described above.

DESCRIPTION OF THE PREFERRED EMBODIMENTS

The present invention will hereinafter be described in detail by reference to the drawings.

Figure 1A:
FIGS. 1A through 1F illustrate a production process of a color filter according to an embodiment of the present invention.

In the production of a color filter, a base 1 is first used as illustrated in FIG. 1A. A transparent glass is preferred as the base 1.

Figure 1B:
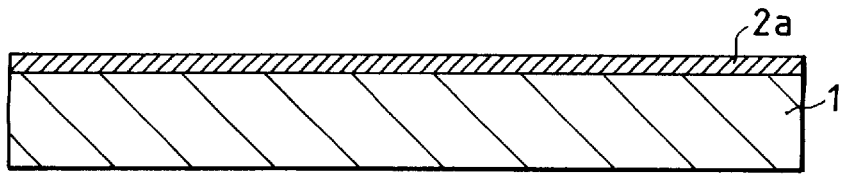
Figure 1C:
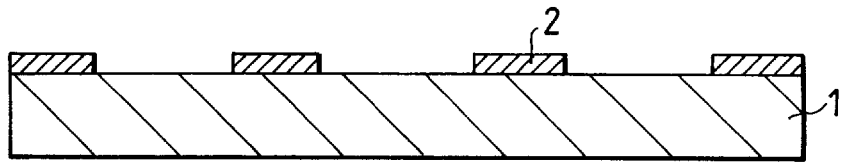

Black matrices are formed on the surface of the glass base 1. As a method of forming the black matrices 2, may be mentioned a method in which a metal film or photosensitive black resin layer is formed on a base, and this film or layer is patterned into black matrices by a photolithographic process, a method in which a resin is used to form a black matrix pattern by printing, a method in which a glass base is etched into a stripe pattern and a black resin is filled in the etched portions by printing, and the like. For example, in the case where a metal film is used, a metal film 2a is first formed on the base 1 as illustrated in FIG. 1B. This metal film 2a is then patterned into black matrices 2 by a known photolithographic process as illustrated in FIG. 1C.

As a material for the metal film, a material low in transmittance and reflectance, such as chromium, molybdenum or aluminum, or the like is preferred.

Figure 1D:
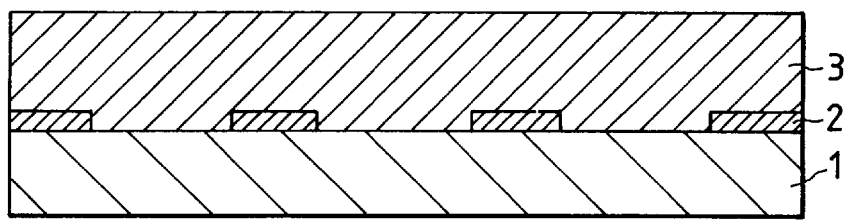

The base 1 on which the pattern 2 has been formed is then etched by using the matrices 2 as a mask as illustrated in FIG. 1D.

In this step, when a hydrofluoric acid type etchant is used as an etchant 3, only the glass base is etched without etching the black matrices. Therefore, only the glass base is etched at its exposed surface portions through openings defined by the black matrices, i.e., portions on which colored pixels 4, 5 and 6 as described below will be formed. By controlling an etching rate of the glass base, the glass base can be etched by the desired depth.

Figure 1E:
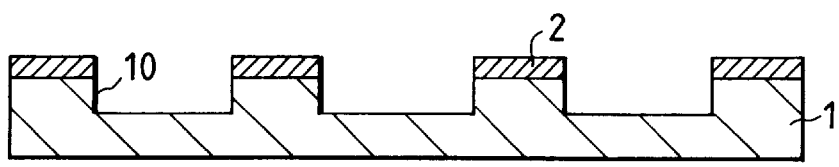

The above-described etching permits the formation of pixel holes 10 as illustrated in FIG. 1E.

Figure 1F:
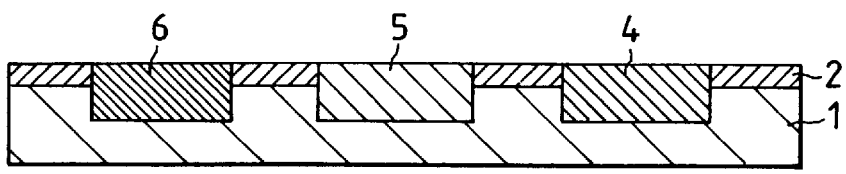

The colored pixels 4, 5 and 6 are then formed in the pixel holes 10 by applying water-based inks containing a water-soluble polymer as illustrated in FIG. 1F.

The colored pixels 4, 5 and 6 can be formed with coloring matters such as dyes and/or pigments by any optional method. However, a method in which ink droplets are applied into the pixel holes 10 by an ink-jet system is particularly preferred. According to the ink-jet system, inks of three colors used in color display elements, i.e., red, green and blue, can be ejected and coated independently and by desired amounts in accordance with the desired pattern. Therefore, colored pixels of the desired colors can be separately formed at the opening portions defined by the black matrices 2. Since the inks of the individual colors are filled in the holes defined in the glass base, color mixing between adjacent colored patterns of different colors can be naturally prevented.

Figure 2:
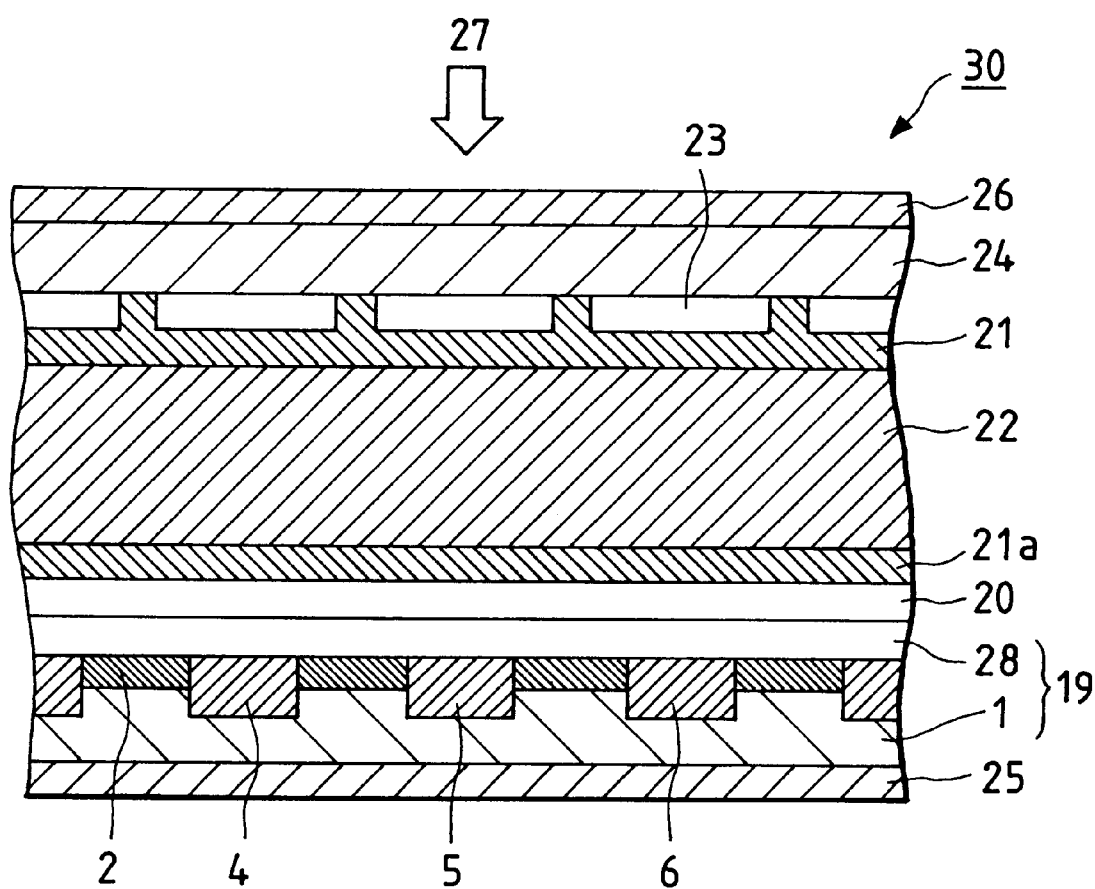
FIG. 2 illustrates a construction of a liquid crystal display panel according to an embodiment of the present invention.

FIG. 2 illustrates a cross-sectional view of a TFT color liquid crystal display panel 30 in which the color filter 19 according to the present invention has been mounted.

The panel 30 is formed by uniting the color filter 19 and a glass base 24 opposite to the color filter 19 and charging a liquid crystal composition 22 in a space between them. TFT (not illustrated) and transparent pixel electrodes 23 are formed in the form of a matrix inside the glass base 24. The color filter 19 is arranged at a position opposite to the pixel electrodes 13 inside the other base 1. A transparent common electrode 20 is formed over on the color filter 19. Orientation films 21 and 21a are further formed on the opposing sides of both bases. Liquid crystal molecules can be oriented in a fixed direction by subjecting these films to a rubbing treatment. Polarizing plates 25 and 26 are bonded to the outer surfaces of both glass bases 1 and 24, respectively. The liquid crystal composition 22 is charged in a space (about 2 to 5 $\mu$m) between these glass bases 1 and 24. As a back light 27, a combination of a fluorescent lamp and a scattering plate (both, not shown) is used. The liquid crystal composition functions as a shutter for changing the transmittance of rays from the back light 27, by which a display can be performed. Reference numeral 28 designates a protective layer. Reference numerals 2, 4, 5 and 6 have the same meaning as in Figs. 1C to 1F.

As the liquid crystal composition, there may be used any conventionally known composition. However, ferroelectric liquid crystals are particularly preferred.

An embodiment in which such a liquid crystal display panel is applied to an information processor will be described by reference to FIGS. 3 through 5.

Figure 3:
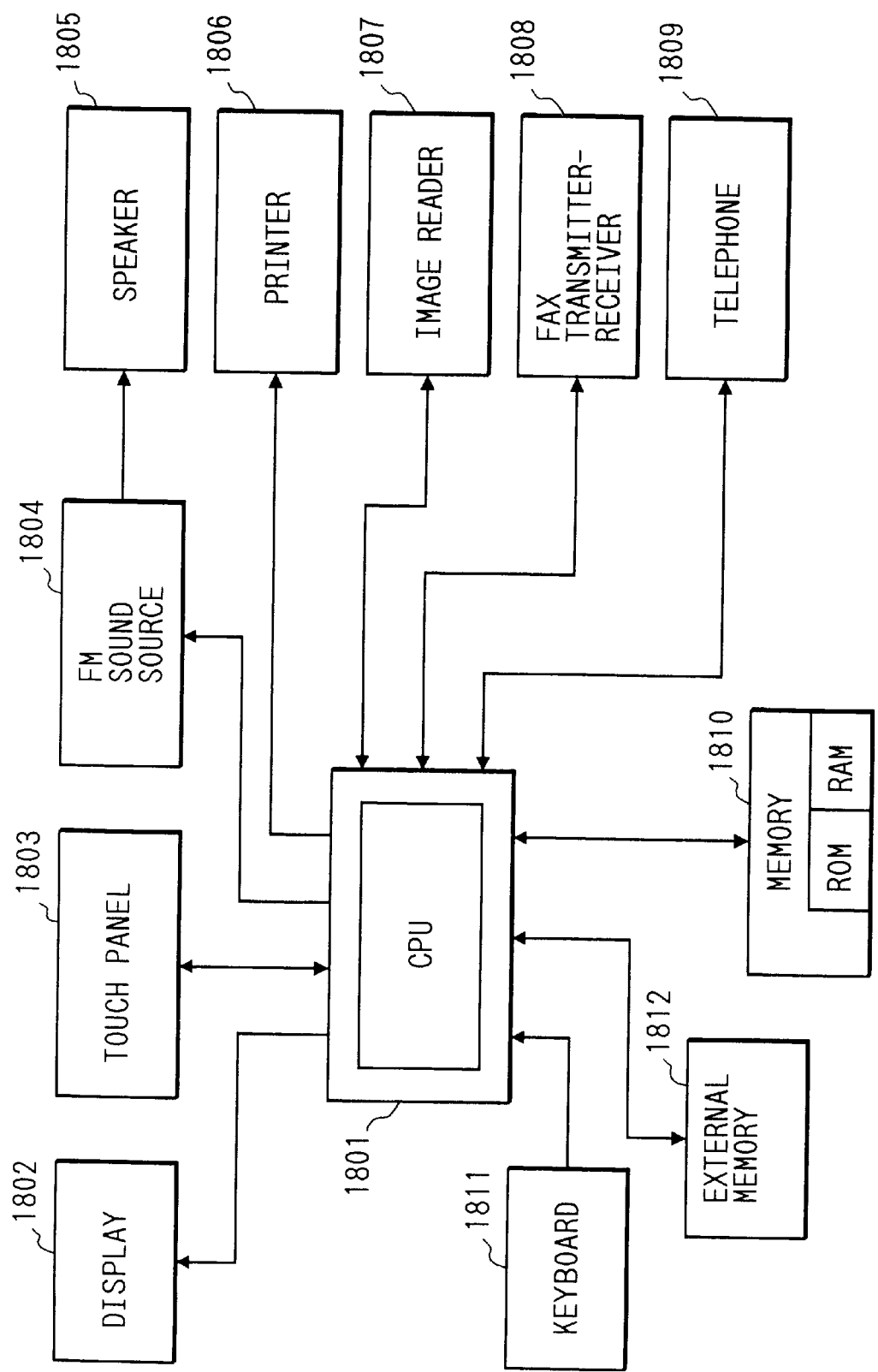
FIG. 3 is a block diagram illustrating a construction in which a liquid crystal display panel according to the present invention is applied to an information processor.

FIG. 3 is a block diagram illustrating a schematic construction of a case where the liquid crystal display panel is applied to an information processor having functions as a word processor, personal computer, facsimile terminal equipment and copying machine.

In FIG. 3, reference numeral 1801 designates a control section serving to control the whole apparatus. The control section 1801 is equipped with a CPU such as a microprocessor, and various I/O ports, and outputs control signals, data signals and the like into individual units and inputs control signals and data signals from the individual units, thereby making control. Reference numeral 1802 indicates a display section. Various menus, document information, image data read by an image reader 1807, etc. are displayed on its display screen. Reference numeral 1803 designates a transparent touch panel of the pressure sensing type, which is provided over the display 1802. Item input, coordinate position input and the like can be performed on the display 1802 by pressing the surface of the touch panel 1803 with fingers or the like.

Reference numeral 1804 indicates an FM (frequency modulation) sound source section in which music information prepared by a music editor or the like is stored as digital data in a memory section 1810 and an external memory 1812 and read from these memories to conduct FM modulation. Electric signals from the FM sound source section 1804 are converted into audio sounds by a speaker section 1805. A printer section 1806 is used as an output terminal for a word processor, personal computer, facsimile terminal equipment and copying machine.

Reference numeral 1807 indicates an image reader section serving to photoelectrically read original data and to input them. The image reader section 1807 is provided in the course of the conveyance of an original and serves to read a facsimile information, copied material and other various original documents.

Reference numeral 1808 designates a transmitter-receiver section of the facsimile (FAX), which effects facsimile transmission of the original document data read by the image reader 1807 and receives facsimile signals sent to decode them. The transmitter-receiver has a function of external interface. Reference numeral 1809 designates a telephone section having various telephone functions such as an ordinary telephone function and an automatic telephone answering function.

Reference numeral 1810 indicates the memory section containing application programs such as a system program and a manager program, a ROM, which stores character fonts, a dictionary, etc., application programs and document information loaded from the external memory 1812, a video RAM, etc.

Reference numeral 1811 designates a keyboard section serving to input document information, various commands and the like.

Reference numeral 1812 designates the external memory which uses, as storage media, floppy disks and hard disks. In this external memory 1812, document information, music or audio information, application programs for users, etc. are stored.

Figure 4:
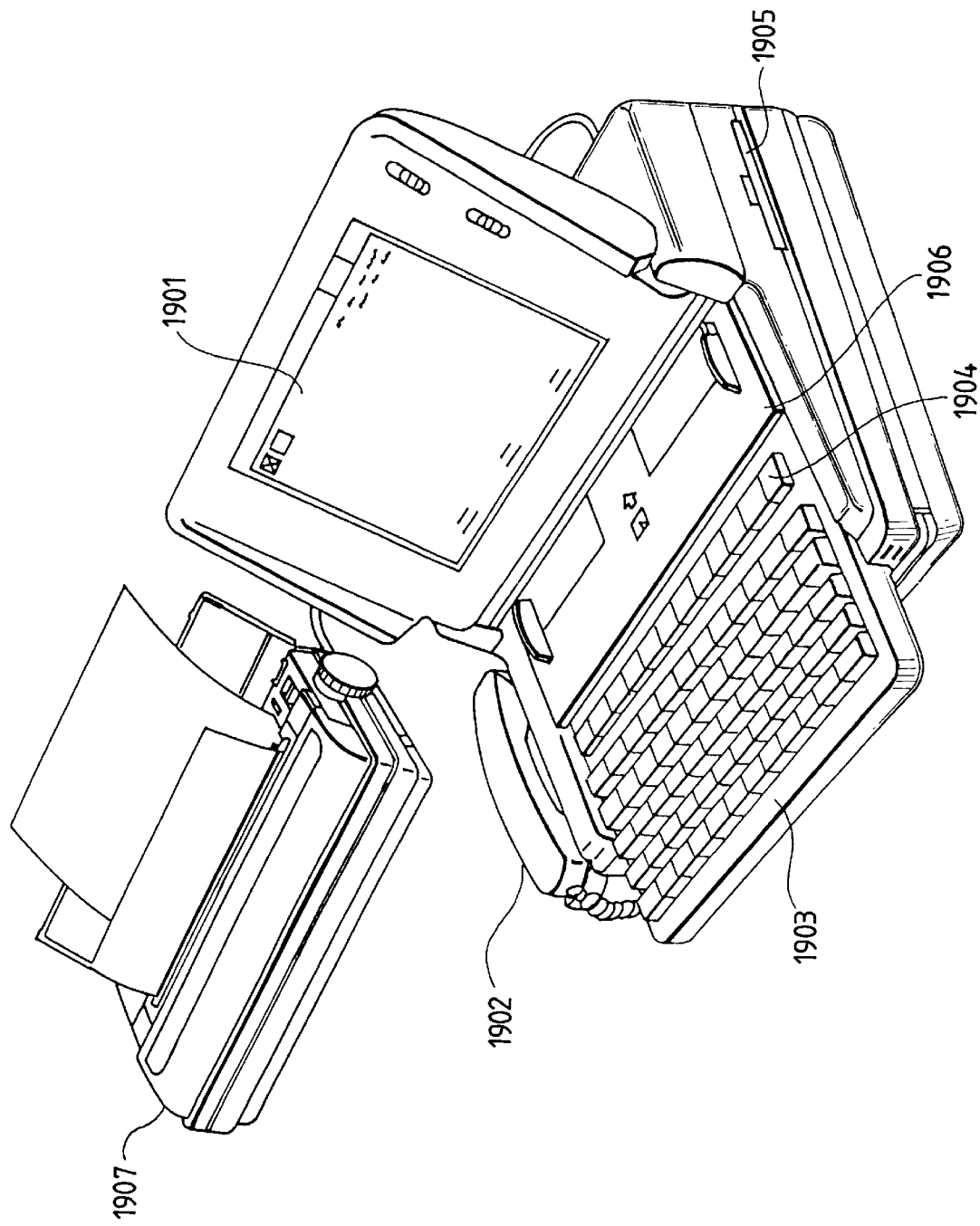
FIG. 4 is a typical bird's-eye view of the information processor of FIG. 3.

FIG. 4 is a typical bird's-eye view of the information processor of FIG. 3.

In FIG. 4, reference numeral 1901 indicates a flat panel display making good use of the above-described liquid crystal display panel and serving to display various menus, graphic information, document information and the like. Coordinate input, item-specifying input and the like can be performed by pressing the surface of the touch panel 1803 over the display 1901 with fingers or the like. Reference numeral 1902 designates a hand set used at the time the processor functions as a telephone. A keyboard 1903 is detachably connected to a main body through a code and serves to effect input of various document functions and various data. Various function keys 1904 and the like are provided in this keyboard 1903. Reference numeral 1905 indicates an insertion opening for a floppy disk into the external memory 1812.

Reference numeral 1906 designates a paper plate on which an original document to be read by the image reader section 1807 is placed. The original document read is discharged from the rear of the processor. Facsimile information or the like received is printed by an ink-jet printer 1907.

When the information processor functions as a personal computer or ward processor, various kinds of information inputted from the keyboard section 1811 are processed in the control section 1801 in accordance with the predetermined program and outputted as images to the printer section 1806.

When the information processor functions as a receiver for a facsimile terminal equipment, facsimile information inputted from the transmitter-receiver section 1808 of the FAX through a telecommunication line is processed for receiving in the control section 1801 in accordance with the predetermined program and outputted as received images to the printer section 1806.

When the information processor functions as a copying machine, an original document is read by the image reader section 1807, and the thus-read original document data are outputted as copy images to the printer section 1806 through the control section 1801. When the information processor functions as a transmitter for a facsimile terminal equipment, original date read by the image reader section 1807 is processed for transmission in the control section 1801 in accordance with the predetermined program and then transmitted to a telecommunication line through the transmitter-receiver section 1808 of the FAX.

Figure 5:
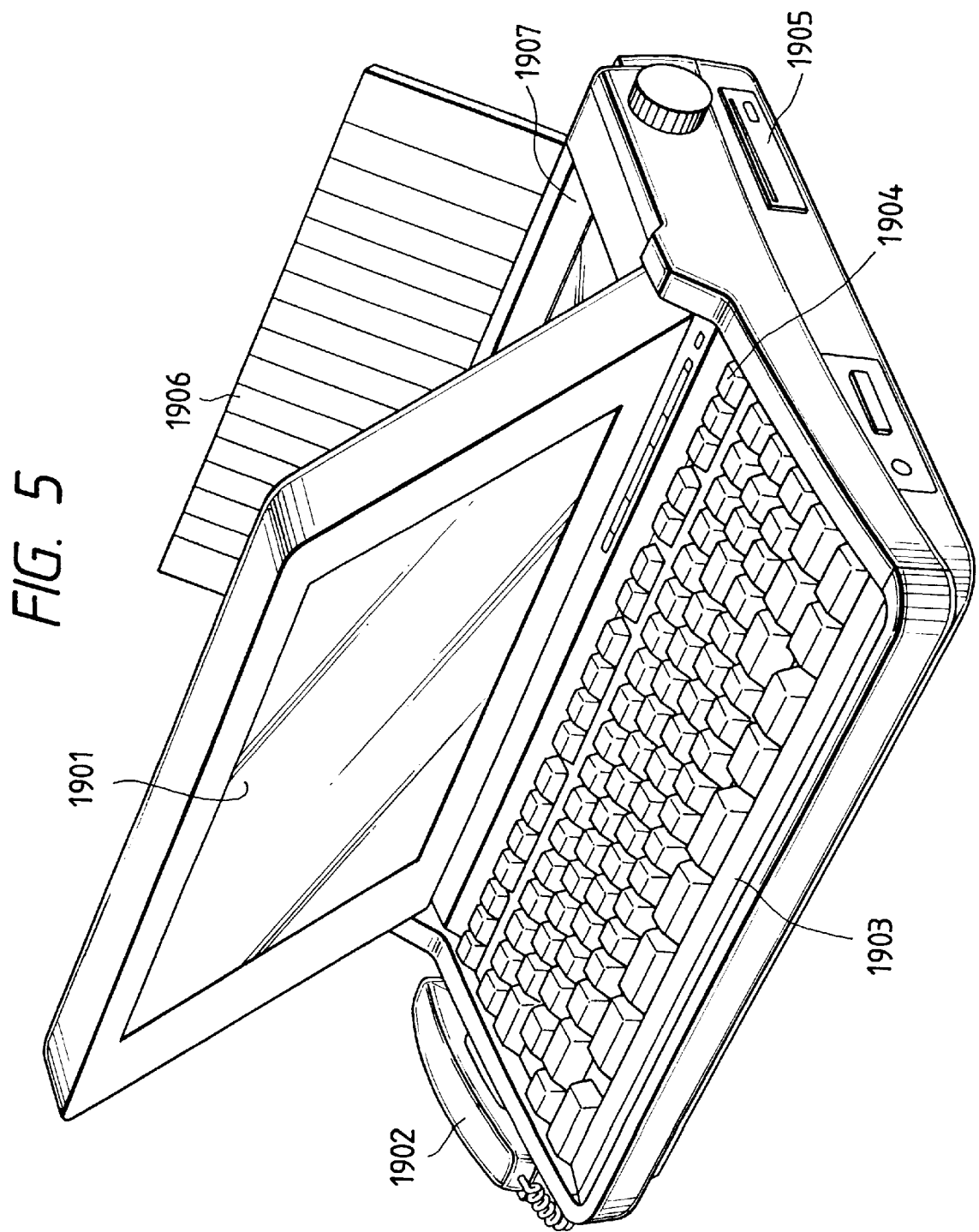
FIG. 5 is a typical drawing illustrating an exemplary information processor.

The information processor may be an integrated apparatus in which an ink-jet printer is built in the main body as illustrated in FIG. 5. In this case, portability may be more enhanced. In FIG. 5, like reference numerals are given to parts having the same function as those in FIG. 4.

Figure 6:
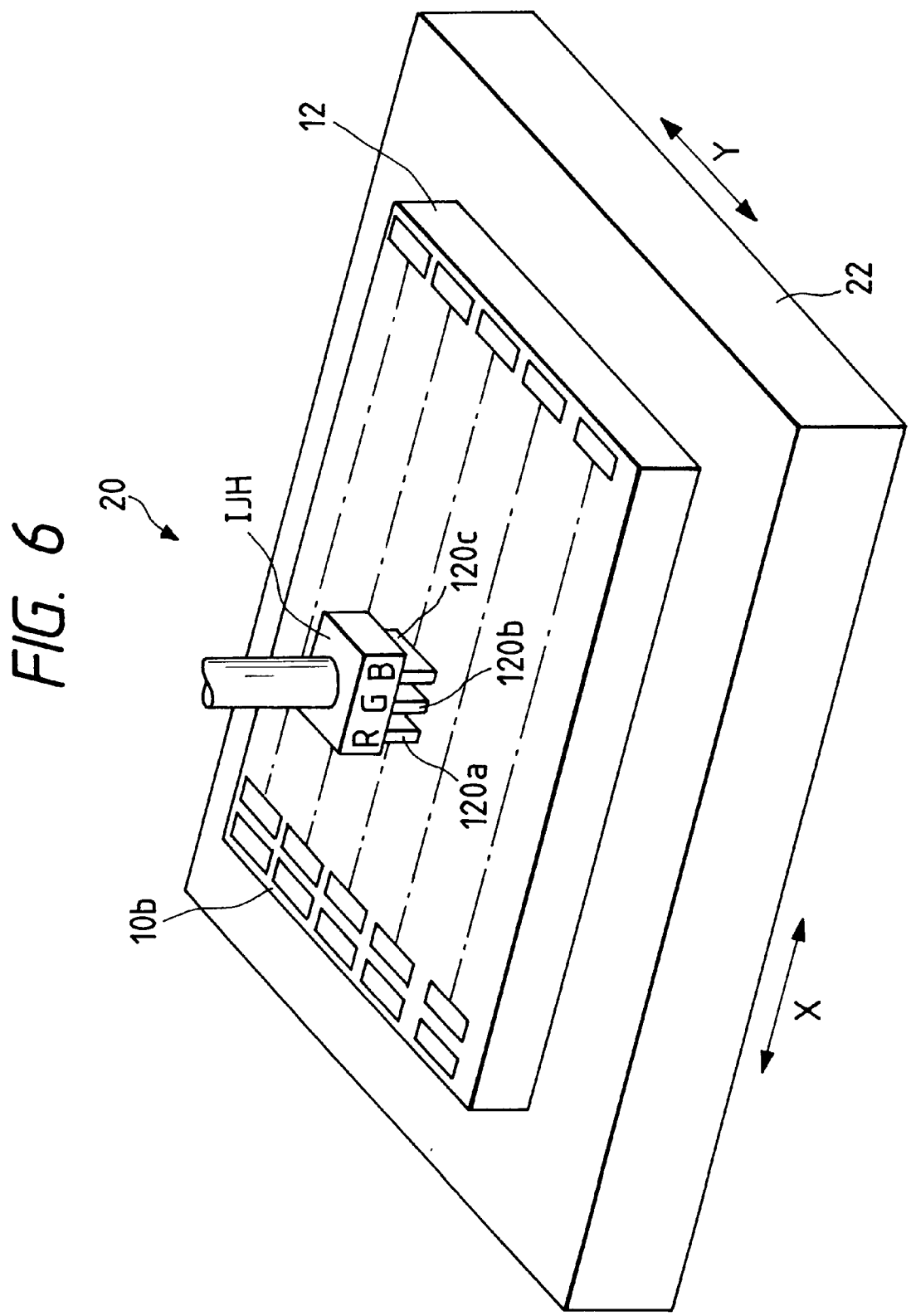
FIG. 6 illustrates a construction of a production apparatus for producing a color filter.

FIG. 6 illustrates a construction of a production apparatus for producing the color filter shown in FIG. 1.

In FIG. 6, the production apparatus 20 is placed on a frame not illustrated and is equipped with an XY table 22 movable in X and Y directions in the drawing and an ink-jet head IJH fixed to the frame via a support member (not illustrated) over the XY table 22. On the XY table 22, is placed a glass base 12 on which black matrices 10*b* and pixel holes have been formed. The ink-jet head IJH is equipped with a head 120*a* for red ink, which ejects a red ink, a head 120*b* for green ink, which ejects a green ink, and a head 120*c* for blue ink, which ejects a blue ink. These heads 120*a*, 120*b* and 120*c* are constructed so as to be able to independently eject their corresponding inks.

In the production apparatus 20 thus constructed, an ink of R, G or B color is ejected within the frame of the desired light-screening lattice 10*b* on the glass base 12 while the XY table 22 is moved in the XY directions to the ink-jet head IJH, thereby coloring the glass base within the individual frames of the light-screening lattices 10*b* to complete a color filter.

Figure 7:
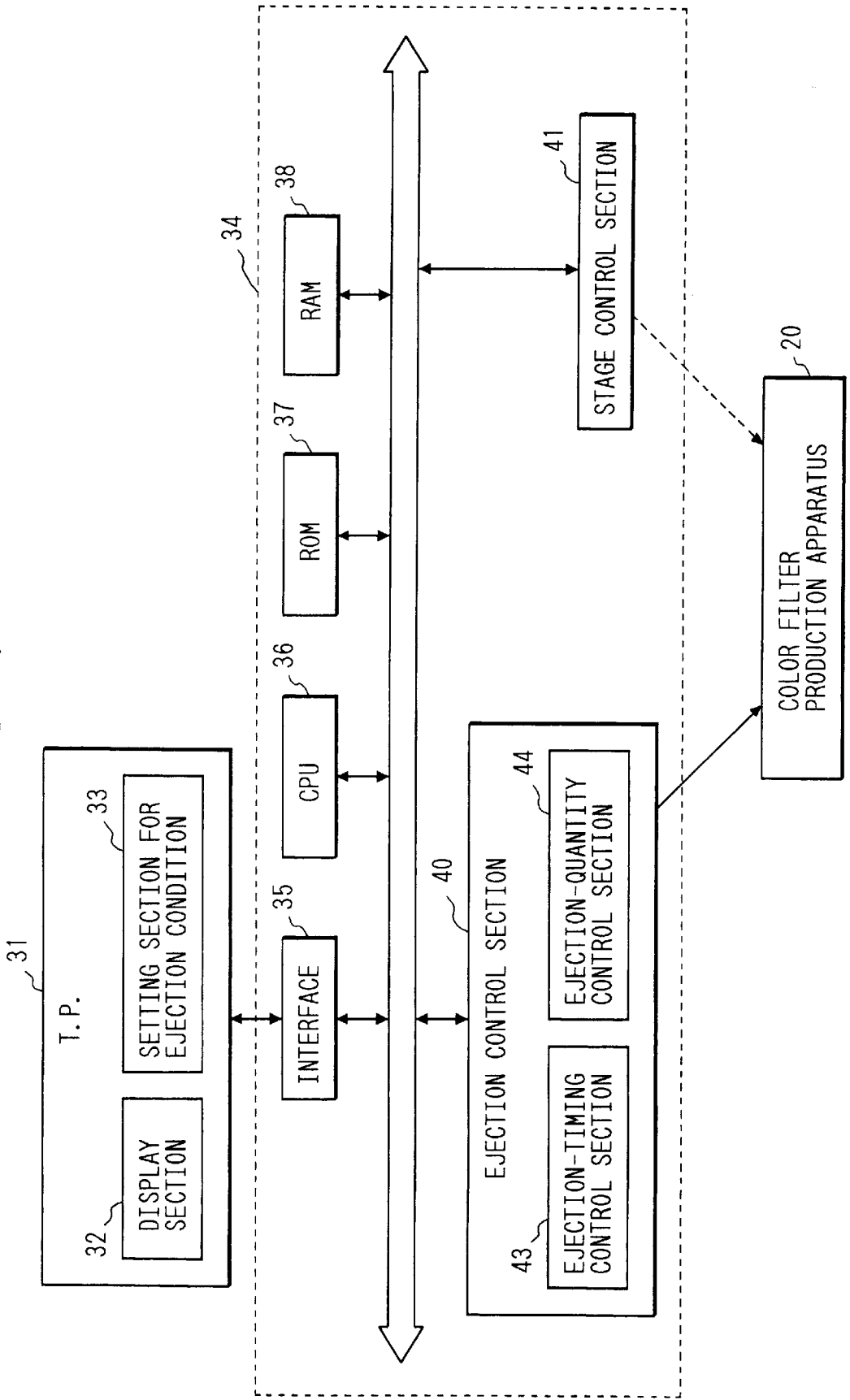
FIG. 7 is a block diagram illustrating a construction of a production controller in the production apparatus of FIG. 6.

FIG. 7 is a block diagram illustrating a construction of a production controller in the production apparatus 20.

In FIG. 7, reference numeral 31 designates a teaching pendant which is an input-output means of the production controller, 32 a display section which displays results of ejection information and the like, and 33 a setting section in which ejection conditions such as an ejection pattern are set.

Reference numeral 34 indicates a controller which controls the production apparatus 20 for the color filter, 35 an interface serving to transfer data to the teaching pendant 31, 36 a CPU serving to conduct the stage control and operation of track planning of the production apparatus 20, 37 a ROM which stores a control program for operating the CPU, 38 a RAM which stores data such as ejection conditions, and 40 an ejection control section serving to control the ejection patterns of colorants, which is a particularly important part in this embodiment. The ejection control section is constructed by an ejection-timing control section 43 which controls the ejection-starting position, ejection interval and ejection number in a filter element, and an ejection-quantity control section 44 which controls the size of a dot in the filter element. Reference numeral 41 designates a control section for the stage 22 of the production apparatus 20. Reference numeral 20 indicates the production apparatus which is connected to the controller 34 and operates on the instruction thereof.

The present invention will hereinafter be described more specifically by the following example. However, the present invention is not limited to this example only.

EXAMPLE 1

A color filter was produced in accordance with the steps shown in FIGS. 1A through 1F.

A metal film 2*a* of chromium having a thickness of 0.1 μm was formed on a glass base 1 and patterned into black matrices 2 by a photolithographic process. This base on which the black matrices had been formed was immersed for 2 minutes in an etchant 3 obtained by mixing hydrofluoric acid (concentration: 35% by weight) with ammonium fluoride (concentration: 10% by weight) in a proportion of 10:1 (by weight), whereby the glass base was etched to a depth of 1.5 μm through openings defined by the black matrices to form pixel holes.

Water-based color inks of red, green and blue colors each comprising a dye, a water-soluble polymer and a solvent were ejected and coated by a bubble jet ejection apparatus on the etched glass base having the black materices so as to apply the individual inks into the pixel holes through the desired openings. The ink quantity to be ejected was preset so as to eject the ink in an amount corresponding to a product of the area of the opening and the depth of the etching. In this example, the specific ink quantity to be ejected was preset to 1 μl. In this case, an opening of an ejection orifice is smaller than the opening defined by the black matrices, and the amount of a droplet of the ejected ink is less than an amount filling the opening defined by the black matrices. As described above, the individual inks of red, green and blue colors were ejected by the ink ejection apparatus to the openings defined by the black matrices in accordance with a pattern. As a result, the three inks of red, green and blue were filled in the pixel holes in the glass base, so that no color mixing between different colors occurred.

The solvent in each of the inks was evaporated by heating, thereby obtaining a color filter. In the thus-obtained color filter, color mixing between the individual colors was prevented, and its color filter pattern was good in that a difference in level between the individual colored patterns was extremely slight. A color liquid crystal display panel produced by using this color filter was high in display quality.

According to the present invention, inks of each color are filled in etched portions of a glass base by means of an ink-jet system in the production of a color filter. Therefore, color mixing between different colors can be prevented, thereby being able to produce a color filter excellent in hue. It is also possible to make a level between the individual colored patterns, which has heretofore been difficult to control, even. Therefore, it is possible to produce a color panel excellent in orientation and high in display quality even if the panel is provided as a color panel using ferroelectric liquid crystals.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A process for producing a color filter, which comprises the steps of:

providing a glass base equipped with black matrices;

etching the glass base using the black matrices as a mask to form pixel holes in the base; and then applying inks into the pixel holes to form colored pixels of different colors.

2. The process according to claim 1, wherein the inks are applied into the pixel holes by an ink-jet system.

3. The process according to claim 2, wherein the ink-jet system is a system utilizing a heater.

4. A process for producing a color filter, which comprises the steps of:

forming black matrices on a glass base;

etching the glass base using the black matrices as a mask to form pixel holes in the base; and then applying inks into the pixel holes to form colored pixels of different colors.

5. The process according to claim 4, wherein the inks are applied into the pixel holes by an ink-jet system.

6. The process according to claim 5, wherein the ink-jet system is a system utilizing a heater.

* * * * *

UNITED STATES PATENT AND TRADEMARK OFFICE
CERTIFICATE OF CORRECTION

PATENT NO. : 5,907,377
DATED : May 25, 1999
INVENTOR(S) : NAOYA NISHIDA, ET AL.

It is certified that error appears in the above-identified patent and that said Letters Patent is hereby corrected as shown below:

On the title page:

Item [56], REFERENCES CITED

FOREIGN PATENT DOCUMENTS

Line 4, "01235903" should read --1-235903--;

Line 12, "01217320" should read --1-217320--;

Line 13, "02228605" should read --2-228605--;

Line 15, "04317007" should read --4-317007--;

Line 16, "04349401" should read --4-349401--;

Line 17, "05173010" should read --5-173010--;

Line 18, "05288913" should read --5-288913--; and

Line 19, "93 24240 12/1993 Japan" should be deleted.

Item [56]

U.S. PATENT DOCUMENTS (continued)

Add --5,566,011  10/1996  Steigerwald ............. 359/67--.

UNITED STATES PATENT AND TRADEMARK OFFICE
CERTIFICATE OF CORRECTION

PATENT NO. : 5,907,377
DATED : May 25, 1999
INVENTOR(S) : NAOYA NISHIDA, ET AL.

It is certified that error appears in the above-identified patent and that said Letters Patent is hereby corrected as shown below:

Item [57], ABSTRACT

"Disclosed herein is a process for producing a color filter, which comprises the steps of:
 providing a glass base equipped with black matrices;
 etching the glass base using the black matrices as a mask to form pixel holes in the base; and then
 applying inks into the pixel holes to form colored pixels of different colors."

should read

--A process for producing a color filter is described, which comprises providing a glass base equipped with black matrices. The glass base having the black matrices is used as a mask and then etched to form pixel holes in the base. Inks are then applied into the pixel holes to form colored pixels of different colors.--.

UNITED STATES PATENT AND TRADEMARK OFFICE
CERTIFICATE OF CORRECTION

PATENT NO. : 5,907,377
DATED : May 25, 1999
INVENTOR(S) : NAOYA NISHIDA, ET AL.

It is certified that error appears in the above-identified patent and that said Letters Patent is hereby corrected as shown below:

COLUMN 1

Line 7, "production" should be deleted, and "of" should read --for producing--;

Line 17, "the production process of" should read --producing--;

Line 19, "production process of" should read --process of producing--;

Line 23, "adopts" should read --uses--, and "process" should read --process which is--;

Line 25, "the dyeing, it requires" should read --dyeing,--;

Line 26, "layer" should read --layer is required--;

Line 27, "a" (first occurrence) should be deleted;

Line 37, "an" should be deleted;

Line 38, "problem" should be deleted; and

UNITED STATES PATENT AND TRADEMARK OFFICE
CERTIFICATE OF CORRECTION

PATENT NO. : 5,907,377
DATED : May 25, 1999
INVENTOR(S) : NAOYA NISHIDA, ET AL.

It is certified that error appears in the above-identified patent and that said Letters Patent is hereby corrected as shown below:

COLUMN 1

Line 46, "production process of" should read --process for producing--.

COLUMN 2

Line 19, "of" should read --for--;

Line 28, "typical" should be deleted; and

Line 30, "typical" should be deleted.

COLUMN 3

Line 5, "by" should read --to--; and

Line 12, "matters" should read --matter--.

COLUMN 4

Line 1, "making" should read --providing--; and

Line 49, "typical" should be deleted.

UNITED STATES PATENT AND TRADEMARK OFFICE
CERTIFICATE OF CORRECTION

PATENT NO.   : 5,907,377
DATED        : May 25, 1999
INVENTOR(S)  : NAOYA NISHIDA, ET AL.

It is certified that error appears in the above-identified patent and that said Letters Patent is hereby corrected as shown below:

<u>COLUMN 5</u>

Line 6, "ward" should read --word--; and

Line 23, "date" should read --data--.

<u>COLUMN 6</u>

Line 35, "materices" should read --matrices--;

Line 64, "thereby being able" should be deleted; and

Line 67, ", even" should be deleted.

Signed and Sealed this

Fourteenth Day of March, 2000

Attest:

Q. TODD DICKINSON

*Attesting Officer*   *Commissioner of Patents and Trademarks*